US011869409B2

(12) United States Patent
Weindorf

(10) Patent No.: US 11,869,409 B2
(45) Date of Patent: Jan. 9, 2024

(54) VEHICLE DISPLAY IMAGE ENHANCEMENT

(71) Applicant: VISTEON GLOBAL TECHNOLOGIES, INC., Van Buren Township, MI (US)

(72) Inventor: Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 17/986,067

(22) Filed: Nov. 14, 2022

(65) Prior Publication Data

US 2023/0186818 A1 Jun. 15, 2023

Related U.S. Application Data

(60) Provisional application No. 63/288,747, filed on Dec. 13, 2021.

(51) Int. Cl.
*G09G 3/20* (2006.01)
*B60K 35/00* (2006.01)

(52) U.S. Cl.
CPC ........... *G09G 3/2007* (2013.01); *B60K 35/00* (2013.01); *B60K 2370/21* (2019.05); *B60K 2370/33* (2019.05); *B60K 2370/48* (2019.05); *G09G 2320/0626* (2013.01); *G09G 2330/021* (2013.01); *G09G 2354/00* (2013.01); *G09G 2360/16* (2013.01); *G09G 2380/10* (2013.01)

(58) Field of Classification Search
CPC ......... G09G 3/2007; G09G 2320/0626; G09G 2360/16; B60K 35/00; B60K 2370/48; B60K 2370/33
See application file for complete search history.

(56) References Cited

U.S. PATENT DOCUMENTS

| | | | |
|---|---|---|---|
| 9,519,149 B2* | 12/2016 | Lee | G02B 27/0179 |
| 10,514,756 B2 | 12/2019 | Mere et al. | |
| 2015/0116377 A1* | 4/2015 | Chang | G09G 3/34 345/690 |
| 2018/0040280 A1* | 2/2018 | Lin | G02F 1/1313 |
| 2019/0228705 A1* | 7/2019 | Furuya | H04N 9/3164 |
| 2020/0150663 A1* | 5/2020 | Parekh | G05D 1/0088 |
| 2021/0400476 A1* | 12/2021 | Bendahan | H04W 12/108 |

* cited by examiner

*Primary Examiner* — Doon Y Chow
(74) *Attorney, Agent, or Firm* — Quinn IP Law

(57) ABSTRACT

An image enhancement system in a vehicle includes a forward looking light sensor, an ambient light sensor, and an electronic control unit. The forward looking light sensor is configured to sense a forward looking light seen by a driver to generate a forward luminance value. The ambient light sensor is configured to sense an ambient light seen by the driver to generate an ambient luminance value. The electronic control unit is configured to calculate a display luminance control value based on the forward luminance value and the ambient luminance value, analyze a video image in a video input signal to determine multiple shades of gray within the video image, adjust the shades of gray in the video image based on the forward luminance value, the ambient luminance value, and the display luminance control value to generate the enhanced video image, and present the enhanced video image to the display.

20 Claims, 6 Drawing Sheets

VEHICLE DISPLAY IMAGE ENHANCEMENT

CROSS-REFERENCE TO RELATED APPLICATIONS

This application claims the benefit of U.S. Provisional Application No. 63/288,747, filed Dec. 13, 2021, which is hereby incorporated by reference in its entirety.

TECHNICAL FIELD

The present disclosure generally relates to systems and methods for vehicle display image enhancement.

BACKGROUND

In automotive display applications, light sensors have been utilized to automatically control the display luminance as a function of the ambient lighting environment. As the ambient environment increases, the display luminance increases to maintain visibility of the images. Automatic luminance control methods maintain a comfortable level of viewing brightness, and reduce a display power consumption as the ambient illumination decreases. Although automatic luminance control methods maintain visibility of symbology for peak-white gray shades, the visibility of lower gray shades may be compromised. More recently, image enhancement methods are becoming available that help make all gray shades more visible to the user. However, such image enhancement methods do not improve the image visibility in response to the ambient illumination level.

SUMMARY

An image enhancement system in a vehicle is provided herein. The enhancement system includes a forward looking light sensor, an ambient light sensor, and an electronic control unit. The forward looking light sensor is configured to sense a forward looking light seen by a driver of the vehicle while looking over a display to generate a forward luminance value. The ambient light sensor is configured to sense an ambient light seen by the driver while looking at the display to generate an ambient luminance value.

The electronic control unit is configured to calculate a display luminance control value based on the forward luminance value and the ambient luminance value to maintain visibility of an enhanced video image in varying lighting conditions, analyze a video image in a video input signal to determine a plurality of shades of gray within the video image, adjust the plurality of shades of gray in the video image based on the forward luminance value, the ambient luminance value, and the display luminance control value to generate the enhanced video image, and present the enhanced video image to the display.

In one or more embodiments of the image enhancement system, the forward looking light sensor is a dedicated light sensor that directly measures the forward looking light entering through a front windshield of the vehicle.

In one or more embodiments of the image enhancement system, the forward looking light sensor is a vehicle dashboard daylight sensor.

In one or more embodiments of the image enhancement system, the forward looking light sensor is a biometric sensor configured to measure a pupil diameter of the driver while the driver is looking over the display, and the electronic control unit is further configured to calculate the forward luminance value in response to the pupil diameter.

In one or more embodiments of the image enhancement system, the forward looking light sensor is disposed in another vehicle, and the forward luminance value is received wirelessly at the electronic control unit.

In one or more embodiments of the image enhancement system, the forward looking light sensor is a camera configured to determine the forward luminance value.

In one or more embodiments of the image enhancement system, the ambient light sensor is a dedicated light sensor configured to measure a light illumination level on a surface of the display facing the driver.

In one or more embodiments of the image enhancement system, the ambient light sensor is a vehicle dashboard daylight sensor.

In one or more embodiments of the image enhancement system, the ambient light sensor is a biometric sensor configured to measure a pupil diameter of the driver while the driver is looking at the display, and the electronic control unit is configured to calculate the ambient luminance value based on the pupil diameter.

In one or more embodiments of the image enhancement system, the ambient light sensor is disposed in another vehicle, and the ambient luminance value is wirelessly received by the electronic control unit.

In one or more embodiments of the image enhancement system, the ambient light sensor is a camera configured to measure the ambient luminance value.

In one or more embodiments of the image enhancement system, the electronic control unit uses the display luminance control value to adjust and maintain visibility of a plurality of dark shades of gray in the enhanced video image.

In one or more embodiments of the image enhancement system, the electronic control unit uses the forward luminance value and the ambient luminance value to adjust and maintain visibility of a plurality of dark shades of gray in the enhanced video image.

In one or more embodiments of the image enhancement system, the adjustment of the plurality of shades of gray in the video image enhances one or more portions of the video image based on a gray scale content in the one or more portions.

In one or more embodiments of the image enhancement system, the electronic control unit dynamically adjusts a plurality of intermediate shades of gray based on the display luminance control value, the forward luminance value, the ambient luminance value, and the gray scale content.

In one or more embodiments of the image enhancement system, the forward luminance value and the ambient luminance value are estimated from wireless weather data around the vehicle, a satellite-based position of the vehicle, a satellite-based direction of travel of the vehicle, and a time of day.

A method for display image enhancement in a vehicle is provided herein. The method includes sensing a forward looking light seen by a driver of the vehicle while looking over a display using a forward looking light sensor to generate a forward luminance value, sensing an ambient light seen by the driver while looking at the display using an ambient light sensor to generate an ambient luminance value, and calculating a display luminance control value based on the forward luminance value and the ambient luminance value to maintain visibility of an enhanced video image on the display in varying lighting conditions.

The method further includes analyzing a video image in a video input signal to determine a plurality of shades of gray within the video image, adjusting the plurality of shades of gray in the video image based on the forward luminance value, the ambient luminance value, and the display luminance control value to generate the enhanced video image, and presenting the enhanced video image on the display to the driver.

In one or more embodiments of the method, the adjusting of the plurality of shades of gray in the video image is a dynamic image enhancement that brightens a plurality of dark shades of gray and a plurality of intermediate shades of gray in the enhanced video image as a function of ambient lighting conditions.

In one or more embodiments of the method, the generation of the display luminance control is an automatic luminance control that dynamically adjusts a luminance level of the display as a function of ambient lighting conditions.

An instrument panel is provided herein. The instrument panel includes a display, a forward looking light sensor, an ambient light sensor, and an electronic control unit. The display is configured to present an enhanced video image to a driver. The forward looking light sensor is configured to sense a forward looking light seen by the driver of a vehicle while looking over the display to generate a forward luminance value. The ambient light sensor is configured to sense an ambient light seen by the driver while looking at the display to generate an ambient luminance value.

The electronic control unit is configured to calculate a display luminance control value based on the forward luminance value and the ambient luminance value to maintain visibility of the enhanced video image on the display in varying lighting conditions, analyze a video image in a video input signal to determine a plurality of shades of gray within the video image, and adjust the plurality of shades of gray in the video image based on the forward luminance value, the ambient luminance value, and the display luminance control value to generate the enhanced video image.

The above features and advantages and other features and advantages of the present teachings are readily apparent from the following detailed description of the best modes for carrying out the teachings when taken in connection with the accompanying drawings.

Figure 1:
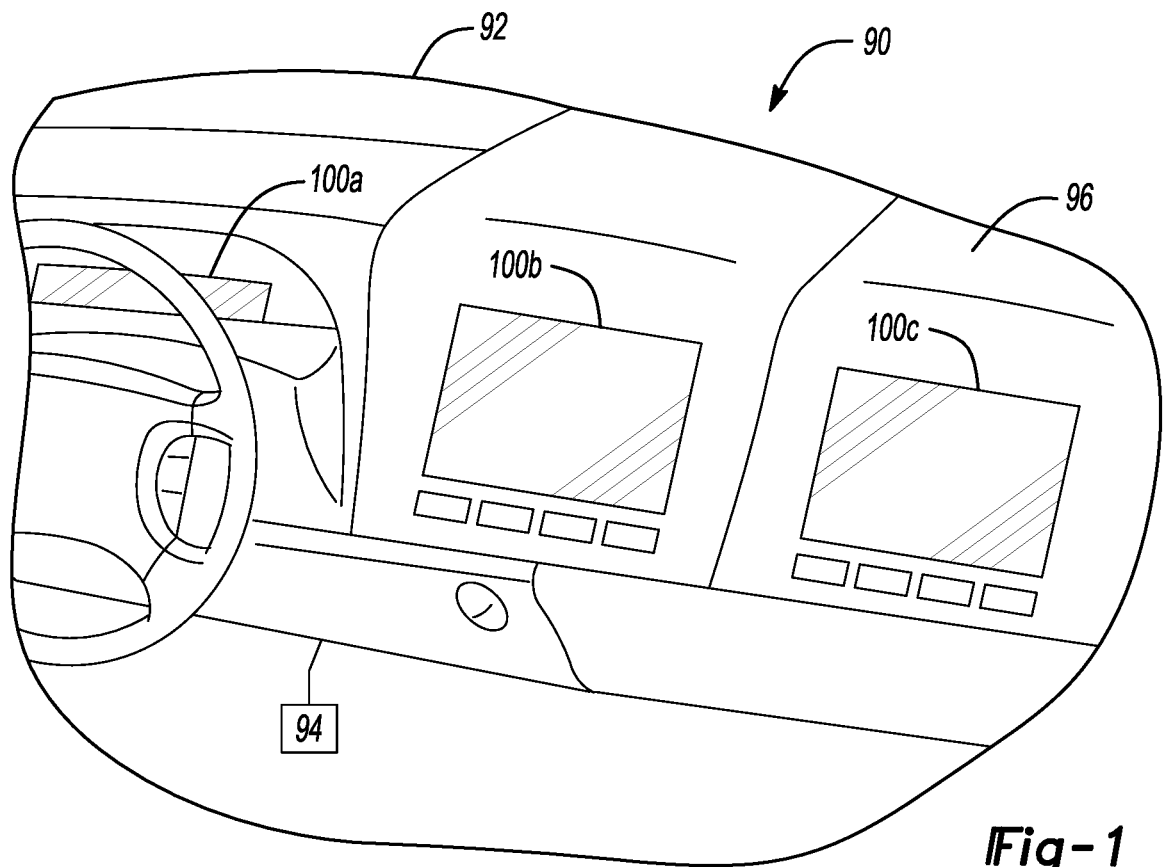
FIG. 1 illustrates a context of a vehicle.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

Embodiments of the disclosure generally provide for a display enhancement system in a vehicle that provides the benefits of both automatic luminance control coupled with image enhancement adjustment as a function of the ambient illumination. The combination provides a new product class that provides visibility of entire images under various ambient lighting conditions, while at the same time reduces an overall power consumption of the display system.

FIG. 1 illustrates a context of a vehicle 90. The vehicle 90 generally includes a body 92, an electronic control unit 94, and an instrument panel 96 having one or more displays 100a-100c. The body 92 may implement an interior body of the vehicle 90. The vehicle 90 may include mobile vehicles such as automobiles, trucks, motorcycles, boats, trains and/or aircraft. In some embodiments, the body 92 may be part of a stationary object. The stationary objects may include, but are not limited to, billboards, kiosks and/or marquees. Other types of vehicles 90 may be implemented to meet the design criteria of a particular application.

The electronic control unit 94 may implement one or more display-driver circuits. The electronic control unit 94 is generally operational to generate control signals that drive the displays 100a-100c. In various embodiments, the control signals may be configured to provide instrumentation (e.g., speed, tachometer, fuel, temperature, etc.) to at least one of the displays 100a-100c (e.g., 100a). In some embodiments, the control signals may also be configured to provide video (e.g., a rear-view camera video, a forward-view camera video, an onboard DVD player, etc.) to the displays 100a-100c. In other embodiments, the control signals may be further configured to provide alphanumeric information shown on one or more of the displays 100a-100c.

In various embodiments, the electronic control unit 94 generally comprises at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be any sort of electronic processor (implemented in hardware, software executing on hardware, or a combination of both). The at least one microcontroller may also include tangible, non-transitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/ output circuitry and devices, as well as appropriate signal conditioning and buffer circuitry.

Computer-readable and executable instructions embodying the present method may be stored in the memory and executed as set forth herein. The executable instructions may be a series of instructions employed to run applications on the at least one microcontroller (either in the foreground or background). The at least one microcontroller may receive commands and information, in the form of one or more input signals from various controls or components in the vehicle 90 and communicate instructions to the displays 100a-100c through one or more control signals to control the displays 100a-100c.

The instrument panel 96 implements a structure (or instrument cluster) that supports the displays 100a-100c. As illustrated, the display 100a may be a cluster display positioned for use by a driver. The display 100b may be a console display positioned for use by the driver and a passenger. The display 100c may be a passenger display positioned for use by the passenger.

The displays 100a-100c are generally mounted to the instrument panel 96. In various embodiments, one or more of the displays 100a-100c may be disposed inside the vehicle 90. In other embodiments, one or more of the displays 100a-100c may be disposed on an exterior of the vehicle 90. One or more of the displays 100a-100c may implement an enhanced vehicle display that is visible to a driver under a variety of lighting conditions. Control signals used to generate images on the displays 100a-100c may be received as electrical communications from the electronic control unit 94.

Figure 2:
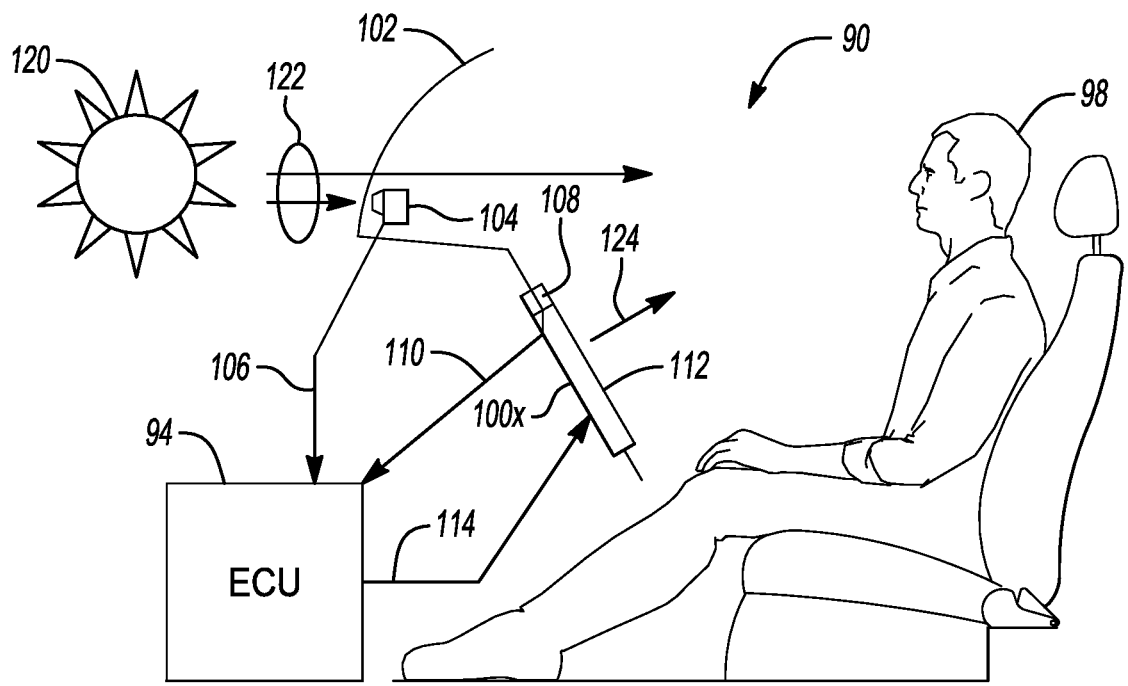
FIG. 2 illustrates a side view schematic diagram of a driver relative to a display in accordance with one or more exemplary embodiments.

FIG. 2 illustrates a side view schematic diagram of an example driver 98 relative a display 100x in accordance with one or more exemplary embodiments. The display 100x may be representative of the displays 100a-100c (e.g., 100a). The driver 98 is shown sitting in a driver's seat of the vehicle 90 behind the display 100a. In other embodiments, the driver 98 may be a passenger sitting in another seat and/or located behind another display 100b and/or 100c. The display 100x generally has a face (or front surface) 112 that can be seen by the driver 98. The vehicle 90 includes the electronic control unit 94, a windshield 102, a forward looking light sensor 104, and an ambient light sensor 108.

The sun 120 may present a forward looking light 122 that passes through the windshield 102 and is received by the forward looking light sensor 104. While the driver 98 is looking up over the display 100x and out through the windshield 102, the driver 98 also sees the forward looking light 122.

An ambient light 124 may be visible to the driver 98 from directions other than from the sun 120. The ambient light 124 may arise from reflections of the light from the sun 120, other lights around the vehicle 90 (e.g., streetlights), lights within the vehicle 90 (e.g., dome lights), other vehicle headlights, and the like. While the driver 98 is looking down at the face 112 of the display 100x and/or at the instrument panel 96, the driver 98 sees the ambient light 124 directly, whereas the forward looking light 122 is out of direct view.

The electronic control unit 94 is in electrical communication with the forward looking light sensor 104, the ambient light sensor 108, and the display 100x. The electronic control unit 94 receives a forward luminance value 106 from the forward looking light sensor 104. The forward luminance value 106 is proportional to an intensity of the forward looking light 122 sensed by the forward looking light sensor 104. The electronic control unit 94 also receives an ambient luminance value 110 from the ambient light sensor 108. The ambient luminance value 110 is proportional to an intensity of the ambient light 124 sensed by the ambient light sensor 108.

The electronic control unit 94 is operational to use the forward luminance value 106 and/or the ambient luminance value 110 to dynamically adjust a display brightness of the display 100x via a display luminance control value 114. Under bright conditions while the pupils of the driver 98 are narrow, the electronic control unit 94 increases the overall brightness of the display 100x (e.g., increases a projection light source within the display) to prevent images on the display 100x from being washed out. Therefore, the driver 98 may comfortably view the brightened images on the display 100x. Under dark conditions while the pupils of the driver 98 are wide, the electronic control unit 94 decreases the overall brightness of the display 100x (e.g., decreases the projection light source) to keep the images on the display 100x from becoming a distraction. Lowering the brightness of the display 100x also helps reduce an electrical power consumption of the display 100x.

Figure 3:
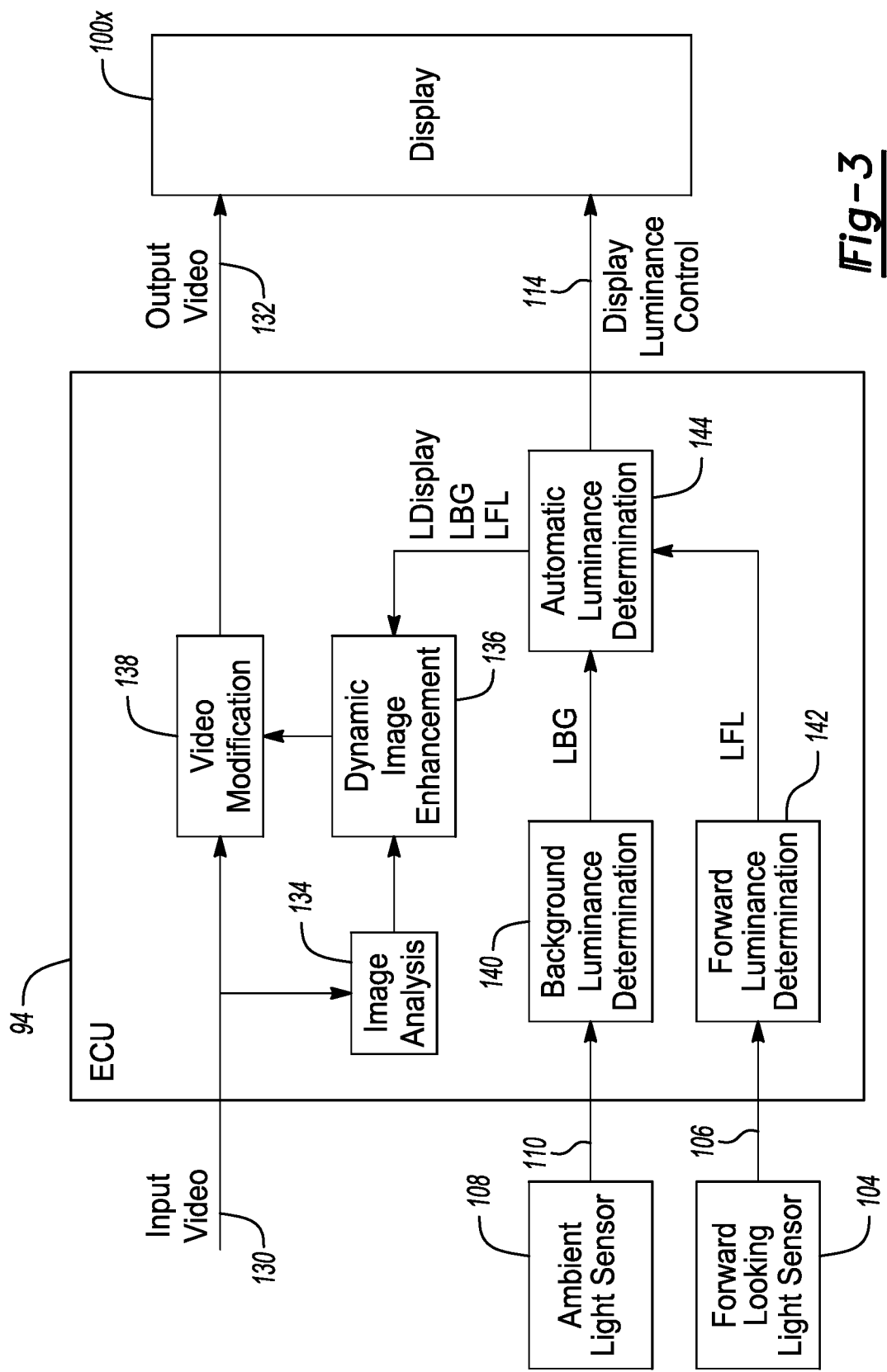
FIG. 3 illustrates a schematic diagram of an electronic control unit in accordance with one or more exemplary embodiments.

FIG. 3 illustrates a schematic diagram of an example implementation of the electronic control unit 94 in accordance with one or more exemplary embodiments. The electronic control unit 94 communicates with the forward looking light sensor 104 to receive the forward luminance value 106, and the ambient light sensor 108 to receive the ambient luminance value 110. The display luminance control value 114 may be generated by the electronic control unit 94 and transferred to the display 100x.

A video input signal 130 is received at an input node of the electronic control unit 94. The video input signal 130 generally carries a sequence of video images that are intended for presentation to the driver 98. A video output signal 132 is generated by the electronic control unit 94 and presented to the display 100x. The video output signal 132 conveys enhanced versions of the video images received in the video input signal 130.

In some embodiments, the electronic control unit 94 includes an image analysis block 134, a dynamic image enhancement block 136, a video modification block 138, a background (or ambient) luminance determination block 140, a forward luminance determination block 142, and an automatic luminance determination block 144. The blocks 134 to 144 may be implemented in hardware and/or software executing on the hardware. The video input signal 130 is received by the image analysis block 134 and the video modification block 138. The video output signal 132 is generated by the video modification block 138. The forward luminance value 106 is received by the forward looking luminance determination block 142. The ambient luminance value 110 is received by the background luminance determination block 140. The display luminance control value 114 is generated by the automatic luminance determination block 144.

The video input signal 130 is initially analyzed by the image analysis block 134 on a frame-by-frame basis to assess the image content by pixel gray shade level. In various embodiments, the frame-by-frame analysis is performed at a nominal frame rate (e.g., 16 milliseconds/frame) to ensure that there is no observable data latency to the driver 98. Based on the ambient luminance information from the automatic luminance determination block 144, the gray shade modification information is determined by the dynamic image enhancement block 136 and sent to the video modification block 138. The video input signal 130 is subsequently dynamically modified in real time by the video modification block 138 to enhance the visibility of the gray shades within the images. The video modification block 138 generates enhanced images in the video output signal 132.

The ambient illumination shining on/reflected from the display 100x is measured by ambient light sensor 108 and the illumination Lux level is communicated to the background luminance determination block 140. The background luminance determination block 140 determines background luminance (LBG) information of the ambient light 124 observed on the front face 112 of the display 100x by the driver 98. The background luminance LBG information is relayed to the automatic luminance determination block 144. The automatic luminance determination block 144 uses the background luminance LBG information received from the background luminance determination block 140 to determine the desired display luminance control value 114. The display luminance control value 114 is used by the display 100x to control the luminance level of the display 100x. Display luminance (LDisplay) information (e.g., the display luminance control value 114 internal to the electronic control unit 94) may be transferred to the dynamic image enhancement block 136.

In parallel to the ambient (background) luminance processing, the forward looking light sensor 104 measures the forward looking luminance value 106 seen by the driver 98 looking through the windshield 102. In addition to controlling the display luminance as a function of the ambient luminance value 110 measured by the ambient light sensor 106, display visibility performance may be improved by the utilization of the forward looking light sensor 104 to compensate for conditions of transient adaptation or eye adaptation mismatch. When the driver 98 looks at a bright scene, such as a sun rise or sun set, the display luminance may be increased since the pupils of the driver 98 are constricted and thus may require more display luminance for image visibility. Under the sun rise/sun set scenarios, the ambient light sensor 108 may be shaded and so, without the use of the forward looking light sensor 104, may cause the display luminance to be decreased. The implementation of the forward looking light sensor 104 thus allows the display luminance to be properly controlled to increase the display luminance where appropriate.

An illuminance Lux level of the forward looking light sensor 104 is conveyed to the forward luminance determination block 142. The forward luminance determination block 142 determines forward looking luminance (LFL) information for the forward looking light 122 seen by the driver 98. The forward looking luminance LFL information is transmitted to the automatic luminance determination 144. The automatic luminance determination block 144 uses the information in conjunction with the background luminance level LBG information to determine an appropriate display luminance control value 114.

Figure 4:
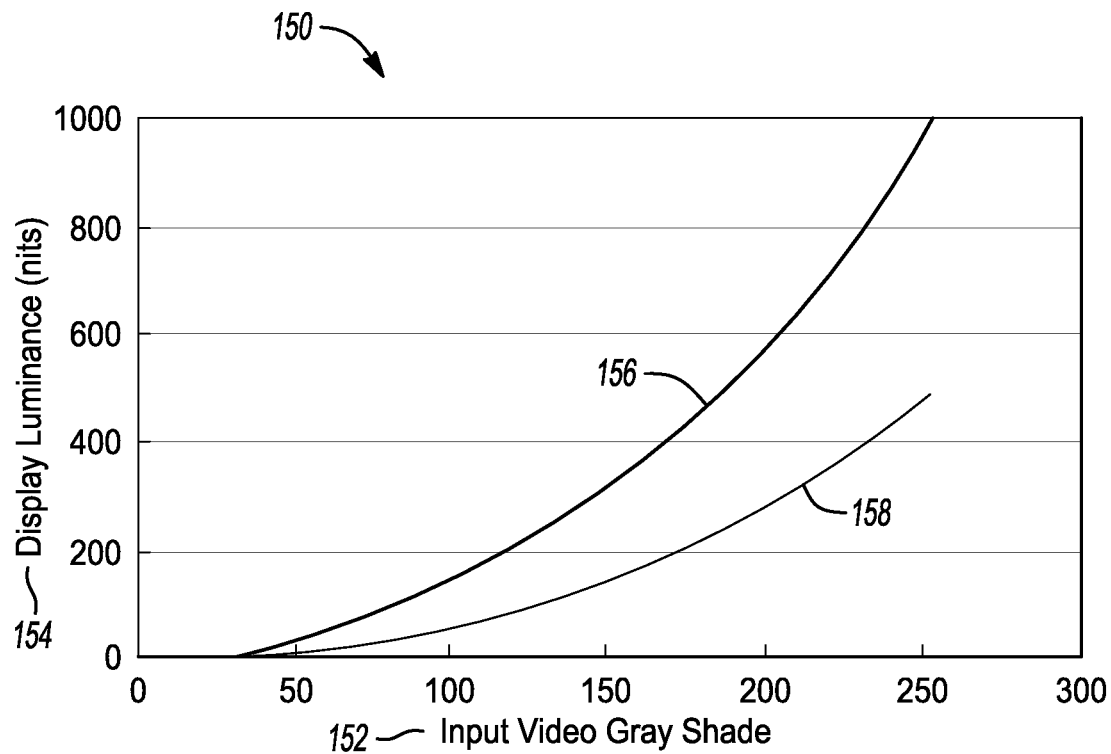
FIG. 4 illustrates a graph of display luminance as a function of input gray shades in accordance with one or more exemplary embodiments.

FIG. 4 illustrates a graph 150 of an example display luminance as a function of input gray shades in accordance with one or more exemplary embodiments. The graph 150 has a first axis 152 and a second axis 154. The first axis 152 generally illustrates the input gray shades available in the input video signal 130. The second axis 154 illustrates the display luminance in units of nits. A nit may be a measure of a candela per square meter (cd/m$^2$).

A curve 156 shows a display gamma at 1000 nits. For bright (or high) gray shades (e.g., >approximately 200 out of 255 maximum for 8-bit images), the display luminance may range from approximately 600 nits at a gray shade of 200, to approximately 1000 nits at the maximum gray shade of 255. For dark (or low) gray shades (e.g., <approximately 50), the display luminance changes little with changes in gray shades and remains near zero nits.

A curve 158 shows a display gamma at 500 nits. For bright (or high) gray shades (e.g., >approximately 200 out of 255 maximum), the display luminance may range from approximately 300 nits at a gray shade of 200, to approximately 500 nits at the gray shade of 255. For dark (or low) gray shades (e.g., <approximately 50), the display luminance changes little with changes in gray shades and remains near zero nits. Other ranges of gray shades and/or other subdivisions of the ranges into bright, intermediate, and dark may be implemented to meet a design criteria of a particular application.

An inherent issue with the automatic luminance control is that the dark gray shades are less visible under all ambient lighting conditions. Merely increasing the display luminance does little for dark gray shade visibility primarily due to the nature of the gamma function (γ) used in the automotive displays 100a-100c per equation 1 as follows:

$$L_{GrayShade} = L_{max}(GS/GS_{max})^\gamma \qquad (1)$$

Where GS is a particular gray shade, GSmax is a maximum gray shade of the image received by the display, $L_{max}$ is a maximum luminance of the display, γ is a gamma function of the display 100x, and $L_{GrayShade}$ is a display luminance at the particular gray shade GS.

Many automotive images have most of the pixels at the dark gray shades (e.g., GS<approximately 50) and the intermediate gray shades (e.g., approximately 51<GS<approximately 200), and a few pixels with higher (bright) gray shade content (e.g., GS>approximately 200). Therefore, in order to have good visibility of the dark gray shades and the intermediate gray shades, the dark gray shade levels and the intermediate gray shade levels are dynamically adjusted upward to higher gray shade levels as a function of ambient lighting conditions. The dynamic adjustment is referred to as a dynamic image enhancement (DIA). The dynamic image enhancement may be accomplished by measuring the current lighting condition and dynamically adjusting the image content for image visibility. Where the dynamic image enhancement is combined with the automatic luminance control, the display image may remain visible under all lighting conditions, and a peak white luminance may be adjusted for comfortable viewing. Limiting the peak white luminance affords a benefit of reduced display power dissipation.

Figure 5:
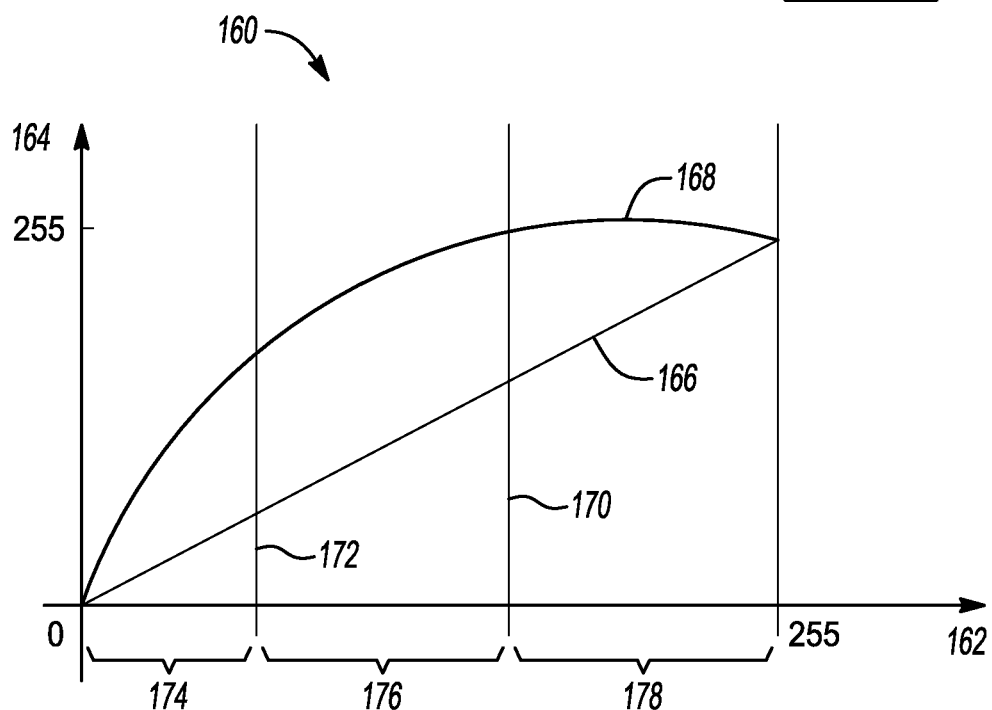
FIG. 5 illustrates a graph of gray shade enhancement in accordance with one or more exemplary embodiments.

FIG. 5 illustrates a graph 160 of an example enhancement of gray shades in accordance with one or more exemplary embodiments. The graph 160 has a first axis 162 and a second axis 164. The first axis 162 generally illustrates the input gray shades available in the input video signal 130. The input gray shades in the example have a range of 0 to 255. The second axis 164 illustrates the output gray shade available in the output video signal 132. The output gray shades in the example also have the range of 0 to 255. Other ranges of the shades of gray (e.g., 0 to 1023 for 10-bit images) 255 may be implemented to meet the design criteria of a particular application.

A curve 166 (e.g., a straight line) shows a non-enhanced transfer of the gray shades from the input video signal 130 to the output video signal 132. Each gray shade in the output video signal 132 matches a corresponding gray shade in the input video signal 130. In a typical automotive application, a small percentage (e.g., <5 percent) of the images in the input video signal 130 will have gray shade content to the right (e.g., brighter) than the line 170 in the bright shade region 178. The majority of the gray shade content is generally in the dark shade region 174 between the zero gray shade and the line 172, and in the intermediate shade region 176 between the line 170 and the line 172.

A curve 168 shows an enhanced transfer of the gray shade form the input video signal 130 to the output video signal 132. The enhancement may increase the output gray shades in the dark shade region 174 and the intermediate shade region 176, while maintaining the bright shade region 178 with little to no change. As a result, the dark gray shades and the intermediate gray shades are brighter on the display 100x and so are more easily seen by the driver 98 under brighter lighting conditions.

Figure 6:
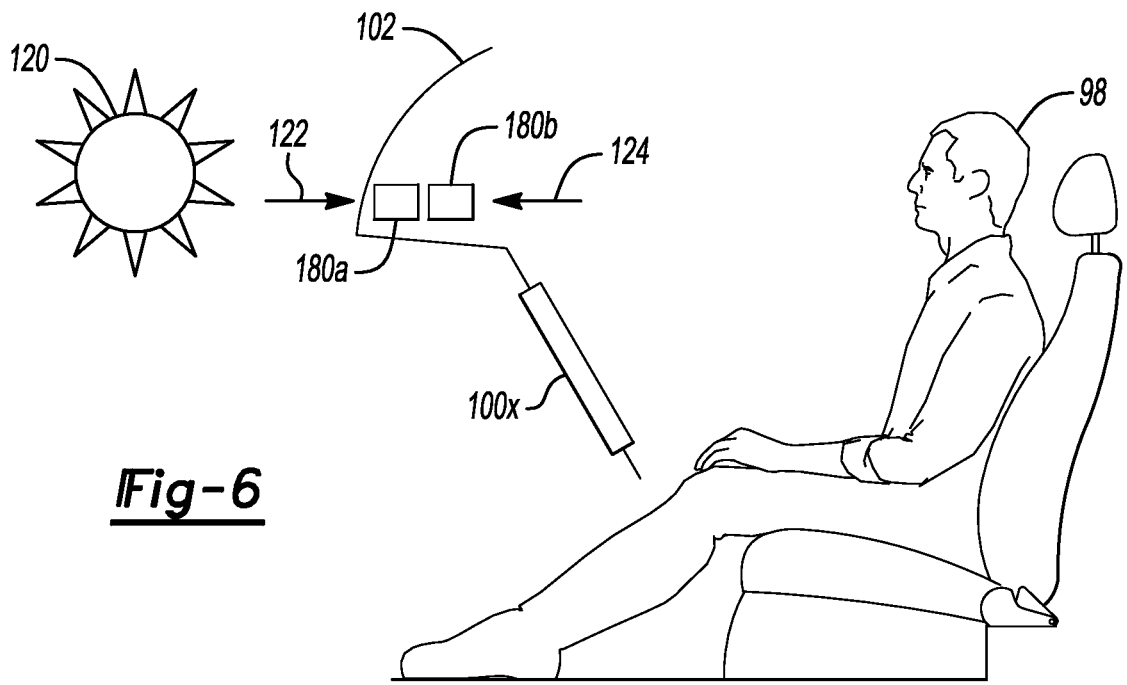
FIG. 6 illustrates a schematic diagram of light sensors in accordance with one or more exemplary embodiments.

FIG. 6 illustrates a schematic diagram of an example implementation of light sensors in accordance with one or more exemplary embodiments. Other light sensors, such as daylight sensors 180a and 180b on the dashboard and/or in an electronic mirror (not shown) may be used for the ambient light sensor 108 and/or the forward looking light sensor 104 to estimate the forward luminance value 106 and the ambient luminance value 110. The daylight sensor 180a may be positioned and oriented to sense the forward looking light 122 received through the windshield 102. The daylight sensor 180b may be positioned and oriented to sense the ambient light 124.

Figure 7:
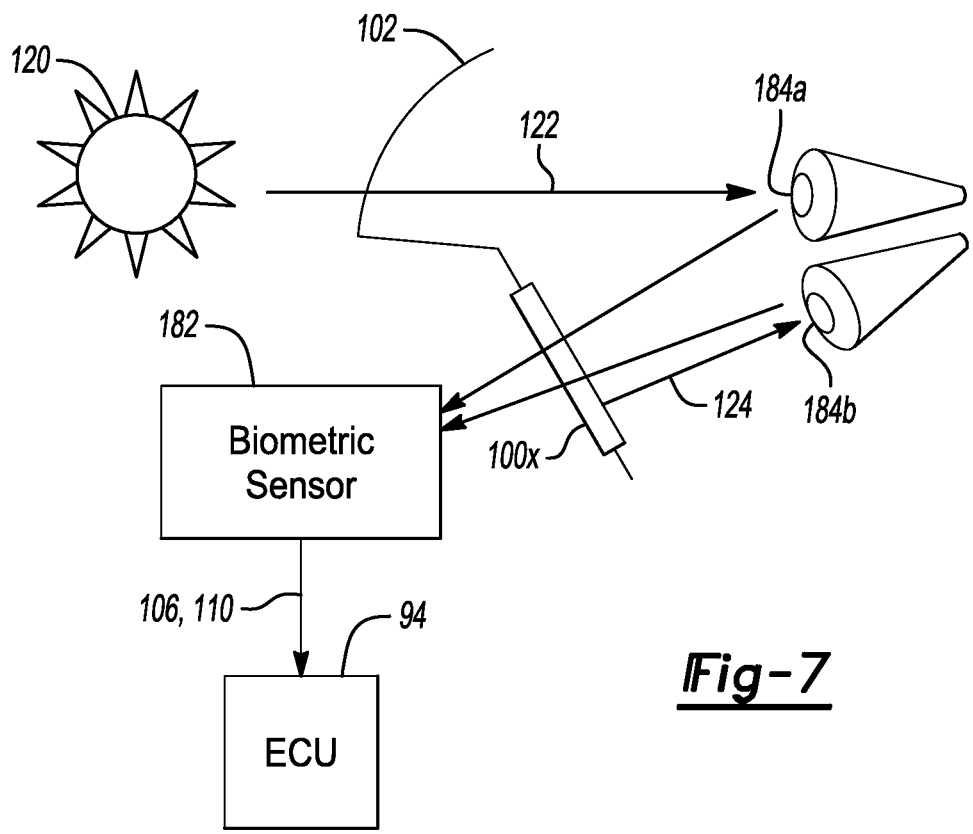
FIG. 7 illustrates a schematic diagram of other light sensors in accordance with one or more exemplary embodiments.

FIG. 7 illustrates a schematic diagram of another example implementation of light sensors in accordance with one or more exemplary embodiments. A biometric sensor 182 that measures a pupil diameter of one or both eyes of the driver 98 may be used to determine the forward looking light 122 and/or the ambient light 124. While the driver 98 is looking through the windshield 102, the biometric sensor 182 may measure a forward looking pupil diameter 184a. From the measurement, the biometric sensor 182 may determine an approximate intensity of the forward looking light 122 and report an estimated forward luminance value 106 to the electronic control unit 94. While the driver 98 is looking at the display 100x, the biometric sensor 182 may measure an ambient looking pupil diameter 184b. From the measurement, the biometric sensor 182 may determine an approximate intensity of the ambient light 124 and report an estimated ambient luminance value 110 to the electronic control unit 94.

Figure 8:
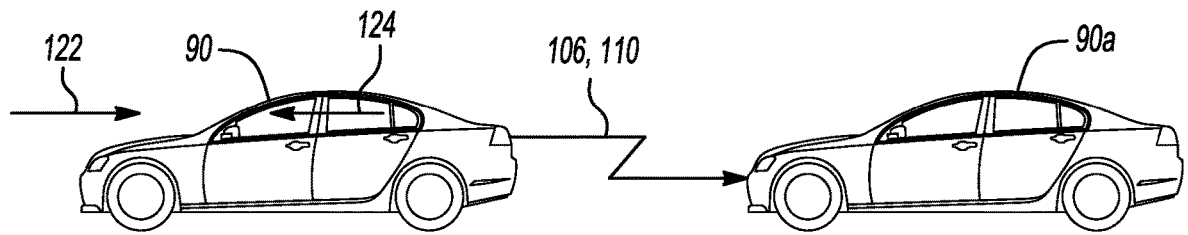
FIG. 8 illustrates a schematic diagram of still other light sensors in accordance with one or more exemplary embodiments.

FIG. 8 illustrates a schematic diagram of still another example implementation of light sensors in accordance with one or more exemplary embodiments. In various embodiments, vehicle-to-vehicle communication may be used to estimate the forward looking light 122 and the ambient light 124 in the vehicle 90 and subsequently transfer the information to another vehicle 90a. While the vehicle 90 and the other vehicle 90a are travelling in the same direction with a typical spacing, the forward looking light 122 entering the vehicle 90 may be similar to, or the same as the forward looking light 122 entering the other vehicle 90a. Likewise, the ambient light 124 experienced inside the vehicle 90 may be similar to, or the same as the ambient light 124 experienced inside the other vehicle 90a. Therefore, the forward luminance value 106 and the ambient luminance value 110 determined in the vehicle 90 may be suitable to control the displays in the other vehicle 90a.

Figure 9:
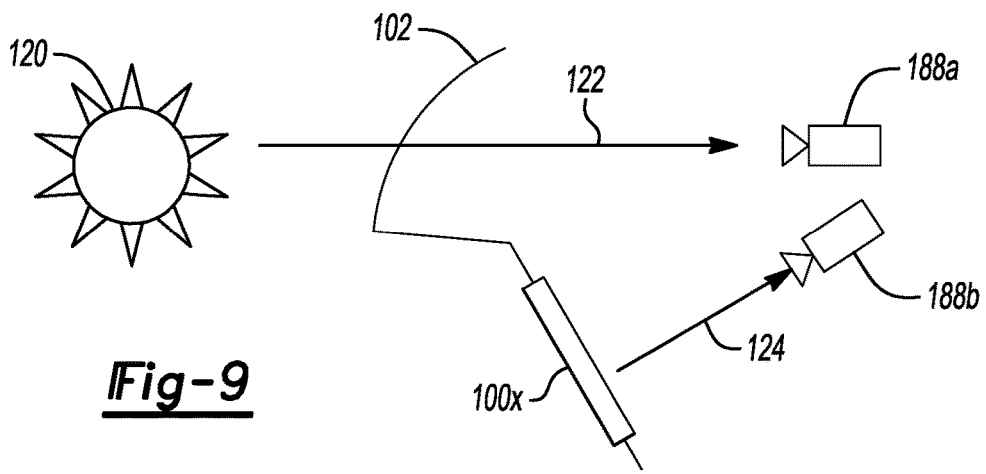
FIG. 9 illustrates a schematic diagram of light sensors in accordance with one or more exemplary embodiments.

FIG. 9 illustrates a schematic diagram of an example implementation of light sensors in accordance with one or more exemplary embodiments. A forward facing camera 188a may be used as the forward looking light sensor 104 to capture the forward looking light 122 received through the windshield 102. An interior facing camera 188b may be used as the ambient light sensor 108 to capture the ambient light 124. In various embodiments, other interior cockpit cameras and/or other cameras may be implemented to meet the design criteria of a particular application.

Figure 10:
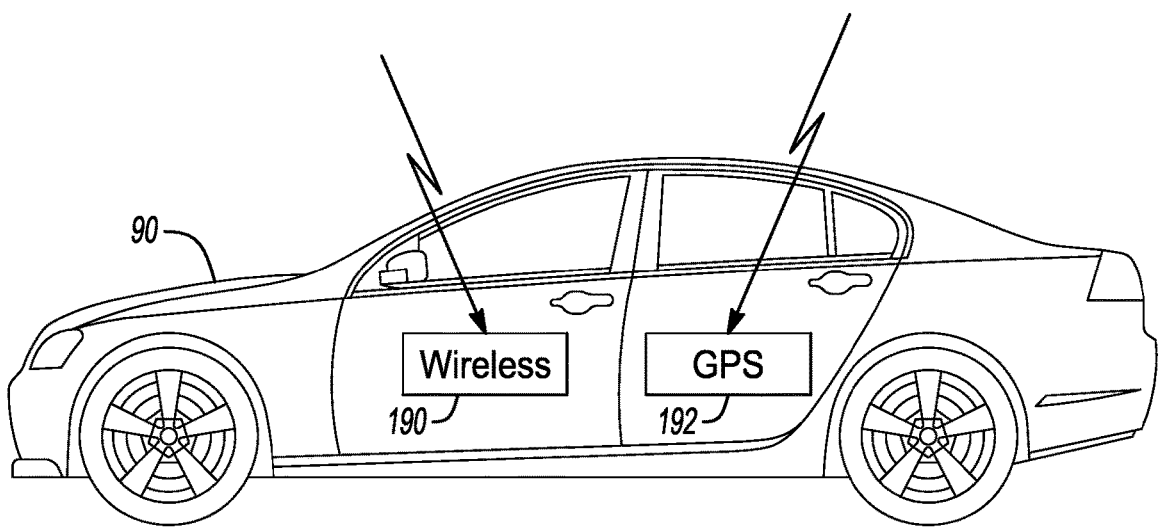
FIG. 10 illustrates a schematic diagram for light sensing in accordance with an exemplary embodiment.

FIG. 10 illustrates a schematic diagram of an example for light sensing in accordance with an exemplary embodiment. The vehicle 90 may include a wireless connection 190 to the Internet and a satellite-based positioning receiver 192. In various embodiments, the satellite-based positioning receiver may be a Global Positioning System receiver. The satellite-based positioning receiver 192 may be used to determine time, a position, orientation, and direction of travel of the vehicle 90. The wireless connection 190 may receive weather conditions, time and sunlight reports for the position of the vehicle 90. The weather data, time, sunlight data, position, orientation and direction of travel may be utilized to estimate the sunlight illumination conditions (e.g., the forward looking light 122) as input data to the automatic luminance determination block 144 that the driver 98 may be experiencing based on the direction of travel, weather conditions, and time of day. The ambient light 124 may be determined by the on-board light sensors.

The display luminance LDisplay information, the background luminance LBG information, and the forward looking luminance LFL information are conveyed to the dynamic image enhancement block 136. The dynamic image enhancement block uses the information to dynamically determine the correct image enhancement corrections for complete display visibility. The dynamic image enhancement block 136 may be realized by different implementations and may employ artificial intelligence and/or deterministic methods.

An aspect of the integrated enhancement approach is that the reflected background LBG information, the forward looking luminance LFL information, and the automatically determined display luminance signal LDisplay information is sent to the dynamic image enhancement 138. With the display luminance signal LDisplay information available, the dynamic image enhancement 138 uses the commanded display luminance to determine the correction appropriate for the dark shade(s) of gray to maintain visibility. Therefore, the dark shades of gray visibility is independently maintained even though the display luminance may be decreased.

In addition to maintaining the dark gray shade visibility, the intermediate gray shade visibility is also maintained by using the commanded display luminance in the determining the correction factors. Therefore, as the display luminance is automatically decreased, the enhancement technique independently determines the correction factors for the intermediate gray shades to maintain visibility. The upper gray shade visibility is maintained by the automatic luminance determination block 144, that adjusts the display luminance to maintain comfortable visibility of the upper gray shades, such as peak white symbology.

Figure 11:
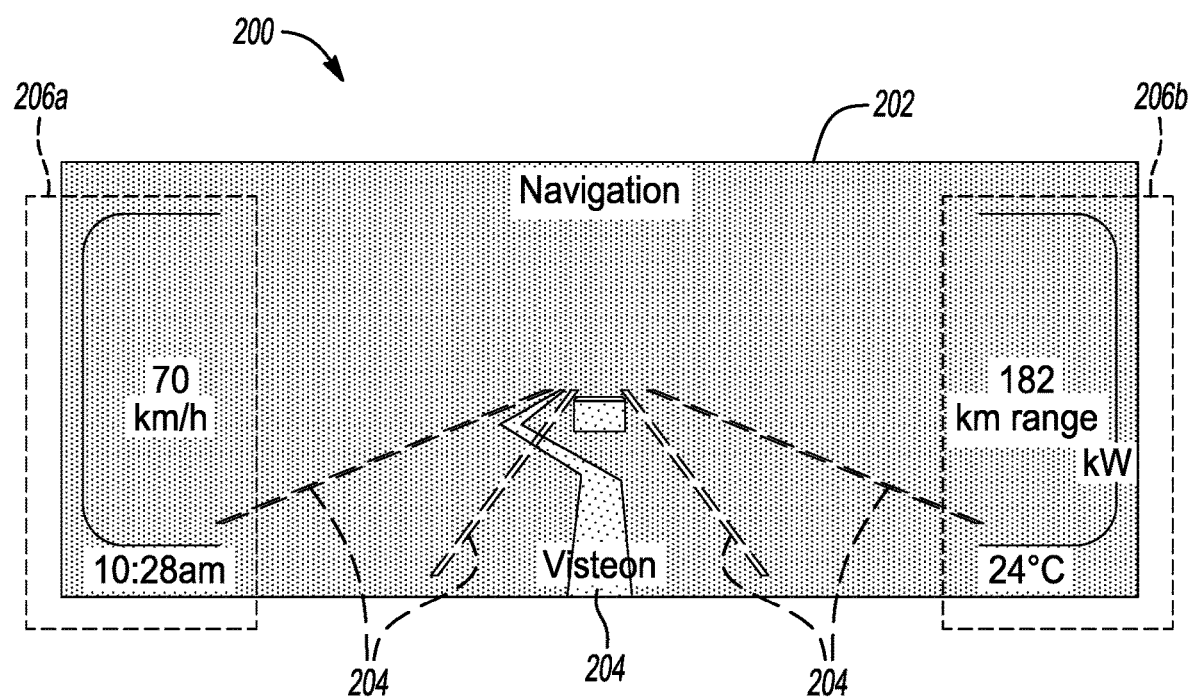
FIG. 11 illustrates an image presented on a display in accordance with one or more exemplary embodiments.

FIG. 11 illustrates an example image 200 presented on a display in accordance with one or more exemplary embodiments. The image 200 illustrates the benefits of both automatic luminance control coupled with image enhancement adjustment as a function of the ambient illumination. A gray scale of the image 200 as shown is inverted for reproducibility. Therefore, the dark symbols would actually be white, the white symbols would actually be black, and the gray symbols would be gray on real display.

The image 200 includes a darker shades of gray portion 202 (e.g., gray shades less than approximately 50 in a range of 0 to 255), an intermediate shades of gray portion 204 (e.g., gray shades between approximately 51 and approximately 200), and multiple bright shades of gray portions

206a-206b (e.g., gray shades greater than approximately 50 200). The darker shades of gray portion 202 may include the entire background of the image 200 and so would appear as black to the driver 98. The intermediate shades of gray portion 204 includes multiple lane markings and a predicted course that would appear as gray symbols on the black background. The bright shades of gray portions 206a-206b include the driving information (e.g., speed, tachometer, fuel, etc.) and generally consumes a small amount of space within the image 200.

Those having ordinary skill in the art will recognize that terms such as "above," "below," "front," "back," "upward," "downward," "top," "bottom," etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the appended claims.

The invention claimed is:

1. An image enhancement system in a vehicle comprising:
    a forward looking light sensor configured to sense a forward looking light seen by a driver of the vehicle while looking over a display to generate a forward luminance value, wherein:
       the display includes a first input that receives an enhanced video image and a second input that receives a display luminance value; and
       the display luminance value controls a projection light source of the display;
    an ambient light sensor configured to sense an ambient light seen by the driver while looking at the display to generate an ambient luminance value; and
    an electronic control unit configured to:
       calculate the display luminance control value based on the forward luminance value and the ambient luminance value to maintain visibility of the enhanced video image in varying lighting conditions;
       present the display luminance control value to the second input of the display;
       analyze a video image in a video input signal to determine a plurality of shades of gray within the video image;
       adjust the plurality of shades of gray in the video image based on the forward luminance value, the ambient luminance value, and the display luminance control value to generate the enhanced video image; and
       present the enhanced video image to the first input of the display.

2. The image enhancement system of claim 1, wherein the forward looking light sensor is a dedicated light sensor that directly measures the forward looking light entering through a front windshield of the vehicle.

3. The image enhancement system of claim 1, wherein the forward looking light sensor is a vehicle dashboard daylight sensor.

4. The image enhancement system of claim 1, wherein:
    the forward looking light sensor is a biometric sensor configured to measure a pupil diameter of the driver while the driver is looking over the display; and
    the electronic control unit is further configured to calculate the forward luminance value in response to the pupil diameter.

5. The image enhancement system of claim 1, wherein the forward looking light sensor is disposed in another vehicle, and the forward luminance value is received wirelessly at the electronic control unit.

6. The image enhancement system of claim 1, wherein the forward looking light sensor is a camera configured to determine the forward luminance value.

7. The image enhancement system of claim 1, wherein the ambient light sensor is a dedicated light sensor configured to measure a light illumination level on a surface of the display facing the driver.

8. The image enhancement system of claim 1, wherein the ambient light sensor is a vehicle dashboard daylight sensor.

9. The image enhancement system of claim 1, wherein:
    the ambient light sensor is a biometric sensor configured to measure a pupil diameter of the driver while the driver is looking at the display; and
    the electronic control unit is configured to calculate the ambient luminance value based on the pupil diameter.

10. The image enhancement system of claim 1, wherein the ambient light sensor is disposed in another vehicle, and the ambient luminance value is wirelessly received by the electronic control unit.

11. The image enhancement system of claim 1, wherein the ambient light sensor is a camera configured to measure the ambient luminance value.

12. The image enhancement system of claim 1, wherein the electronic control unit uses the display luminance control value to adjust and maintain visibility of a plurality of dark shades of gray in the enhanced video image.

13. The image enhancement system of claim 1, wherein the electronic control unit uses the forward luminance value and the ambient luminance value to adjust and maintain visibility of a plurality of dark shades of gray in the enhanced video image.

14. The image enhancement system of claim 1, wherein the adjustment of the plurality of shades of gray in the video image enhances one or more portions of the video image based on a gray scale content in the one or more portions.

15. The image enhancement system of claim 14, wherein the electronic control unit dynamically adjusts a plurality of intermediate shades of gray based on the display luminance control value, the forward luminance value, the ambient luminance value, and the gray scale content.

16. The image enhancement system of claim 1, wherein the forward luminance value and the ambient luminance value are estimated from wireless weather data around the vehicle, a satellite-based position of the vehicle, a satellite-based direction of travel of the vehicle, and a time of day.

17. A method for display image enhancement in a vehicle comprising:
    sensing a forward looking light seen by a driver of the vehicle while looking over a display using a forward looking light sensor to generate a forward luminance value, wherein:
       the display includes a first input that receives an enhanced video image and a second input that receives a display luminance value; and
       the display luminance value controls a projection light source of the display;
    sensing an ambient light seen by the driver while looking at the display using an ambient light sensor to generate an ambient luminance value;

calculating the display luminance control value based on the forward luminance value and the ambient luminance value to maintain visibility of the enhanced video image on the display in varying lighting conditions;

presenting the display luminance control value to the second input of the display;

analyzing a video image in a video input signal to determine a plurality of shades of gray within the video image;

adjusting the plurality of shades of gray in the video image based on the forward luminance value, the ambient luminance value, and the display luminance control value to generate the enhanced video image; and presenting the enhanced video image to the first input of the display.

18. The method according to claim 17, wherein the adjusting of the plurality of shades of gray in the video image is a dynamic image enhancement that brightens a plurality of dark shades of gray and a plurality of intermediate shades of gray in the enhanced video image as a function of ambient lighting conditions.

19. The method according to claim 18, wherein the generation of the display luminance control is an automatic luminance control that dynamically adjusts a luminance level of the display as a function of ambient lighting conditions.

20. An instrument panel comprising:
a display configured to present an enhanced video image to a driver, wherein:
the display includes a first input that receives the enhanced video image and a second input that receives a display luminance value; and
the display luminance value controls a projection light source of the display;

a forward looking light sensor configured to sense a forward looking light seen by the driver of a vehicle while looking over the display to generate a forward luminance value;

an ambient light sensor configured to sense an ambient light seen by the driver while looking at the display to generate an ambient luminance value; and an electronic control unit configured to:
calculate the display luminance control value based on the forward luminance value and the ambient luminance value to maintain visibility of the enhanced video image on the display in varying lighting conditions;

present the display luminance control value to the second input of the display;

analyze a video image in a video input signal to determine a plurality of shades of gray within the video image; and adjust the plurality of shades of gray in the video image based on the forward luminance value, the ambient luminance value, and the display luminance control value to generate the enhanced video image.

* * * * *